(12) United States Patent
Kowaki et al.

(10) Patent No.: US 9,878,742 B2
(45) Date of Patent: Jan. 30, 2018

(54) SUSPENSION TOWER PORTION STRUCTURE OF VEHICLE

(71) Applicant: MAZDA MOTOR CORPORATION, Hiroshima (JP)

(72) Inventors: Miho Kowaki, Hiroshima (JP); Sakayu Terada, Hiroshima (JP); Takehiro Kamei, Hiroshima (JP); Ryotaro Hirata, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/228,397

(22) Filed: Aug. 4, 2016

(65) Prior Publication Data
US 2017/0080983 A1    Mar. 23, 2017

(30) Foreign Application Priority Data
Sep. 18, 2015   (JP) ................................. 2015-185826

(51) Int. Cl.
*B62D 25/08*   (2006.01)
*B60G 15/06*   (2006.01)
*B62D 29/00*   (2006.01)
*B62D 29/04*   (2006.01)

(52) U.S. Cl.
CPC ......... *B62D 25/088* (2013.01); *B60G 15/067* (2013.01); *B60G 2204/128* (2013.01); *B62D 29/008* (2013.01); *B62D 29/04* (2013.01)

(58) Field of Classification Search
CPC ............... B62D 25/088; B60G 15/067; B60G 2204/128
See application file for complete search history.

(56) References Cited

U.S. PATENT DOCUMENTS

| 2015/0360723 | A1* | 12/2015 | Matsuo | B62D 21/15 296/193.01 |
| 2015/0367888 | A1* | 12/2015 | Amemiya | B62D 21/11 296/193.09 |
| 2016/0185394 | A1* | 6/2016 | Sasaki | B62D 29/00 296/191 |
| 2016/0200361 | A1* | 7/2016 | Goto | B62D 25/088 296/203.01 |
| 2016/0355064 | A1* | 12/2016 | Amemiya | B62D 25/088 |

FOREIGN PATENT DOCUMENTS

| JP | 2015-067067 A | | 4/2015 |
| JP | 2015-093508 A | | 5/2015 |
| JP | 2015093508 A | * | 5/2015 |
| JP | 2015093509 A | * | 5/2015 |
| JP | 2015131538 A | * | 7/2015 |

* cited by examiner

*Primary Examiner* — Darlene P Condra
(74) *Attorney, Agent, or Firm* — Studebaker & Brackett PC

(57) ABSTRACT

A suspension tower portion structure of a vehicle is configured such that an upper face portion of a suspension tower portion comprises an fastening face portion where plural fastening portions to which an upper-side attached portion of a suspension is fixedly fastened are provided, plural arc-shaped wall portions which are each provided to rise around the fastening portion are provided on the fastening face portion, and the arc-shaped wall portion is configured to be spaced apart from a fastening seat portion of a fastening member to be fastened to the fastening portion 11, having a constant distance therebetween.

3 Claims, 6 Drawing Sheets

SUSPENSION TOWER PORTION STRUCTURE OF VEHICLE

BACKGROUND OF THE INVENTION

The present invention relates to a suspension tower portion structure of a vehicle.

A suspension tower portion which is configured such that an upper end portion of a suspension is fixedly fastened to an upper face portion of the suspension tower portion and a rib is provided at the upper face portion, thereby improving the rigidity, in a vertical direction, of the suspension tower portion is known.

Japanese Patent Laid-Open Publication Nos. 2015-067067 or 2015-093508, for example, disclose a two-stage structure of the upper face portion of the suspension tower portion which comprises an fastening face portion for fastening the upper end portion of the suspension and a top face portion provided at a higher level than the fastening face portion and connected to the fastening face portion via a ring-shaped rib. At an upper face of the fastening face portion of the suspension tower portion is further provided a radial-shaped rib which extends in a radial direction on an outer-peripheral side of the ring-shaped rib, and the rigidity of the upper face portion is increased by the ring-shaped rib and the radial-shaped rib.

Further, plural fastening portions to which the upper end portion of the suspension is fixedly fastened are provided on the outer-peripheral side of the ring-shaped rib between the adjacent radial-shaped ribs at the fastening face portion.

Herein, since the fastening portion is provided on the outer-peripheral side of the ring-shaped rib between a pair of adjacent radial-shaped ribs as described above, a distance between a peripheral portion of a fastening seat portion at the fastening portion and the radial-shaped rib is not constant. Accordingly, the rigidity of a portion around the fastening portion does not become uniform, so that there is a case in which a stress which is generated by a load inputted in the vertical direction from the suspension may not become constant at a peripheral portion of a fastening seat face and thus the stress may concentrate locally.

That is, there is room for further improvement in the rigidity, in the vertical direction, of the suspension tower portion from stand points of suppressing local stress concentration at the fastening portion.

SUMMARY OF THE INVENTION

The present invention has been devised in view of the above-described problems, and an object of the present invention is to provide a suspension tower portion structure of a vehicle which can effectively improve the rigidity, in the vertical direction, of the suspension tower portion by preventing the local stress concentration at the fastening portion where the suspension is fastened.

The present invention is a suspension tower portion structure of a vehicle, wherein an upper face portion of a suspension tower portion comprises an fastening face portion where plural fastening portions to which an upper end portion of a suspension is fixedly fastened are provided, plural fastening-portion surrounding wall portions which are each provided to rise around the fastening portion are provided on the fastening face portion, and the fastening-portion surrounding wall portion is configured to be spaced apart from a fastening seat portion of a fastening member to be fastened to the fastening portion, having a constant distance therebetween.

According to the present invention, since the fastening-portion surrounding wall portion is configured to be spaced apart from the fastening seat portion of the fastening member, having the constant distance between them, the rigidity of the portion around the fastening portion can be improved so as to be substantially uniform. Thereby, the stress generated by the load input from the suspension becomes constant and thus the stress does not concentrate locally. Accordingly, the rigidity, in the vehicle direction, (i.e., the vertical rigidity) of the suspension tower portion can be improved effectively.

Herein, the above-described fastening-portion surrounding wall portion may be configured as a rib which is provided to project in the vertical direction on the fastening face portion, or a vertical wall portion which extends in the vertical direction from the fastening face portion.

In an embodiment of the present invention, an outer-peripheral wall portion which extends downward from an outer edge of the fastening face portion is provided, the fastening-portion surrounding wall portion is formed in an arc shape and provided on the side of a central-axis line of the suspension around the fastening portion, and a pair of outer-peripheral-side ribs which extend toward the outer-peripheral wall portion from both end portions, in an arc direction, of the fastening-portion surrounding wall portion are provided on the fastening face portion.

According to this embodiment, the rigidity of the fastening face portion can be improved by the outer-peripheral-side rib over a wide range from the fastening-portion surrounding wall portion to the outer-peripheral wall portion. Thereby, the vertical rigidity of the suspension tower portion can be improved more effectively.

In another embodiment of the present invention, the fastening portions are provided at three points, three fastening-portion connecting wall portions which connect each adjacent ones of the plural fastening-portion surrounding wall portions are provided on the fastening face portion and located at positions which correspond to respective sides of a triangle in a plan view.

According to this embodiment, since the fastening-portion connecting wall portions are located at the positions corresponding to the respective sides of the triangle in the plan view, the rigidity of the fastening-portion connecting wall portions can be effectively improved by the effect of a truss structure. Thereby, the vertical rigidity of the suspension tower portion can be improved more effectively.

Other features, aspects, and advantages of the present invention will become apparent from the following description which refers to the accompanying drawings.

DETAILED DESCRIPTION OF THE INVENTION

Embodiments of the present invention will be described referring to the accompanying drawings. While a one-side (right side) part, in a vehicle width direction, of a suspension tower portion structure will be described in the flowing description, the other-side (left side) part is the same as the one-side part. In the figures, forward/rearward, inward/outward, and upward/downward directions show longitudinal, width, and vertical directions of a vehicle, respectively, unless there is any special explanation.

Figure 1:
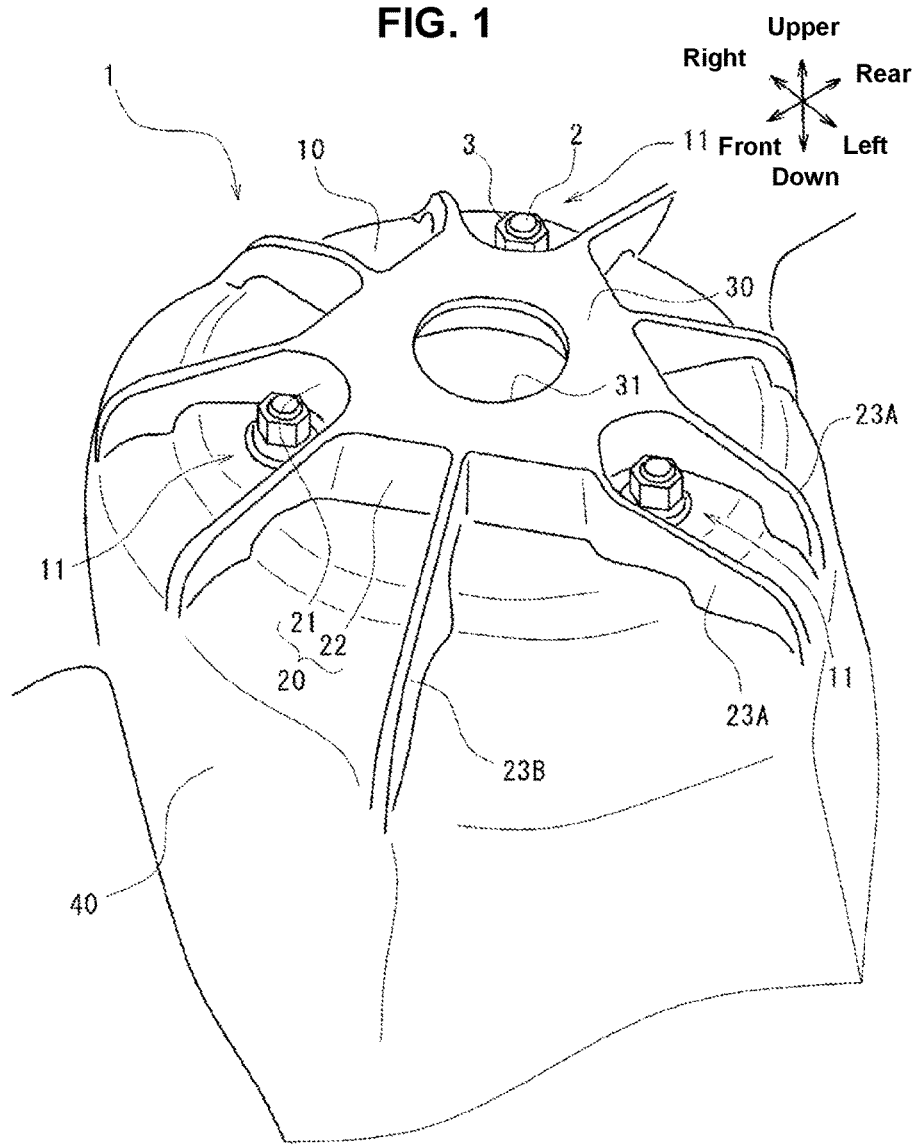
FIG. 1 is a perspective view showing a suspension tower portion structure according to an embodiment of the present invention.

FIG. 1 shows a suspension tower portion 1 of the vehicle according to an embodiment of the present invention. As shown in FIG. 1, the suspension tower portion 1 is provided to extend in the vehicle width direction between a front side member and an apron reinforcement which extend in the vehicle longitudinal direction (which are not illustrated), and a suspension 50 (see FIG. 3) which is provided on a right side of a front portion of the vehicle is fixed to the suspension tower portion 1.

The suspension tower portion 1 includes its upper face portion having a two-stage structure, which comprises an fastening face portion 10 to which the suspension 50 is fixedly fastened and a top face portion 30 which is provided at a higher level than the fastening face portion 10. The top face portion 30 is connected to a central portion of the fastening face portion 10 via a vertical wall portion 20. Further, an outer-peripheral wall portion 40 which extends downward is provided at an outer edge of the fastening face portion 10. These elements/members are formed integrally by aluminum die casting, for example.

Plural fastening portions 11 to which an upper-side attachment portion 51 (see FIG. 3) of the suspension 50 is fixedly fastened are formed at the fastening face portion 10. In a plan view of FIG. 2, the fastening portions 11 are formed at three points at roughly equal intervals having a pitch P on a circumference around a central-axis line of the suspension 50 fixedly fastened.

The top face portion 30 is provided to face the upper-side attachment portion 51 of the suspension 50 fixedly fastened, which is formed in a roughly triangular shape having apexes which correspond to the above-described fastening portions 11. Specifically, each apex portion of the top face portion 30 is configured to have a cutout formed in an arc shape having a cutout's center which corresponds to the fastening portion 11. That is, the vertical wall portion 20 which connects the fastening face portion 10 and the top face portion 30 includes an arc-shaped arc wall portion 21 which is positioned at each apex portion of the roughly triangular-shaped top face portion 30 and a connecting wall portion 22 which is positioned at each side portion of the roughly triangular-shaped top face portion 30.

More specifically, the arc-shaped wall portion 21 is formed only on the side of the central-axis line of the suspension 50 around the fastening portion 11, not formed on the side of the outer-peripheral wall portion 40. Therefore, the fastening portion 11 is configured to open on the side of the outer-peripheral wall portion 40 so as not to make water stay there easily. Further, the arc-shaped wall portion 21 is configured to be spaced apart from a fastening seat portion 3b of a fastening nut 3 to be fastened onto the fastening portion 11, having a roughly constant distance therebetween.

Herein, since the fastening nut 3 is a flange nut and the fastening seat portion 3b of the fastening nut 3 is cylindrical in the present embodiment, the arc-shaped wall portion 21 is formed in the arc shape having its arc center which is positioned at the fastening portion 11 in the plan view. Further, the fastening nut 3 is a hexagon nut, and in a case in which the shape of the fastening seat portion 3b is hexagonal, the arc-shaped wall portion 21 is formed in the arc shape having its arc center which is positioned at the fastening portion so as to extend substantially along the hexagonal fastening seat portion 3b in the plan view. Also, in a case in which the fastening nut 3 is fastened to the fastening portion 11 via a washer (not illustrated), the arc-shaped wall portion 21 is configured to extend along a peripheral portion of the washer in the plan view.

The connecting wall portion 22 is configured to straightly connect the adjacent arc-shaped wall portions 21.

Figure 2:
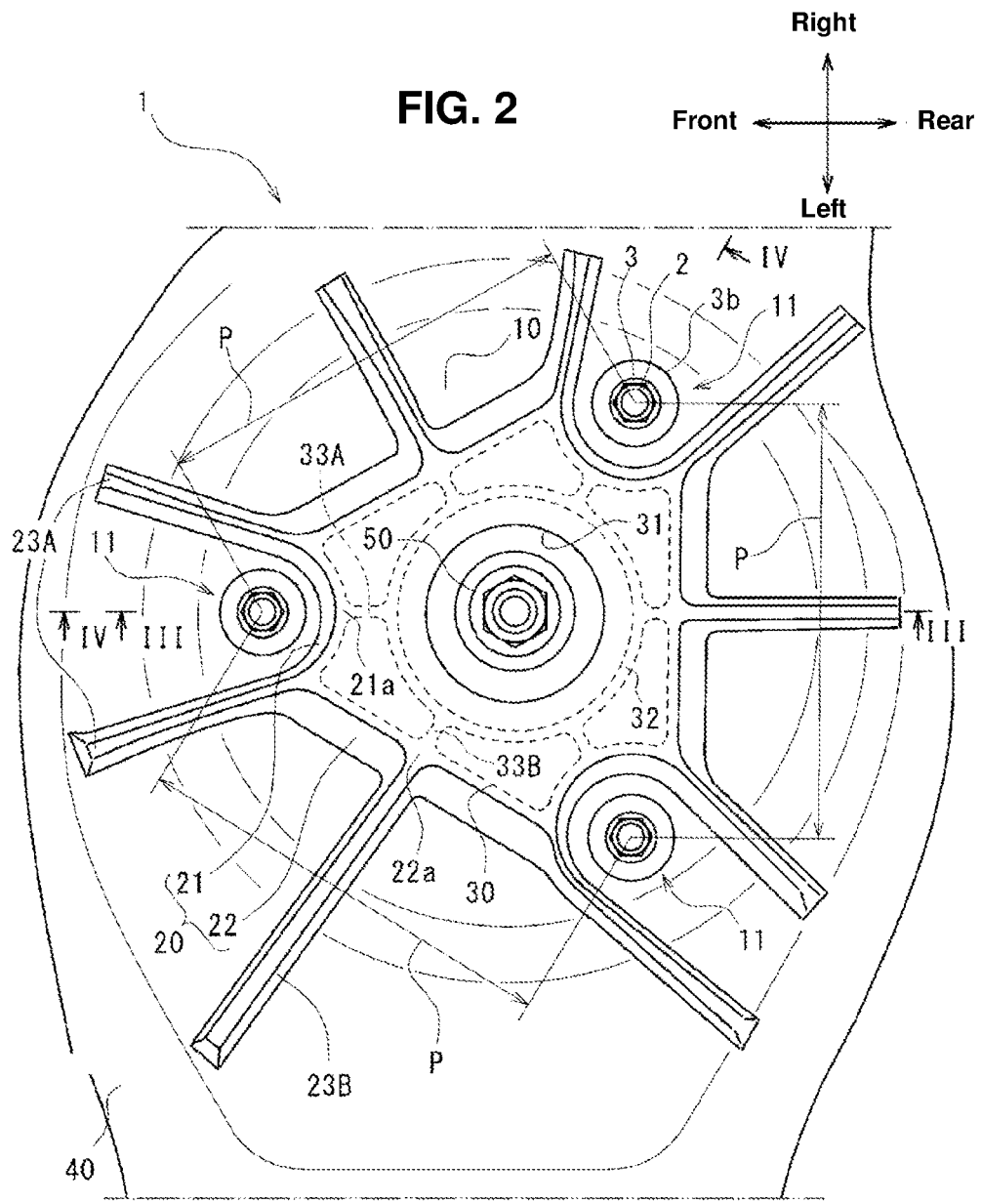
FIG. 2 is a plan view of the suspension tower portion structure of FIG. 1.
Figure 3:
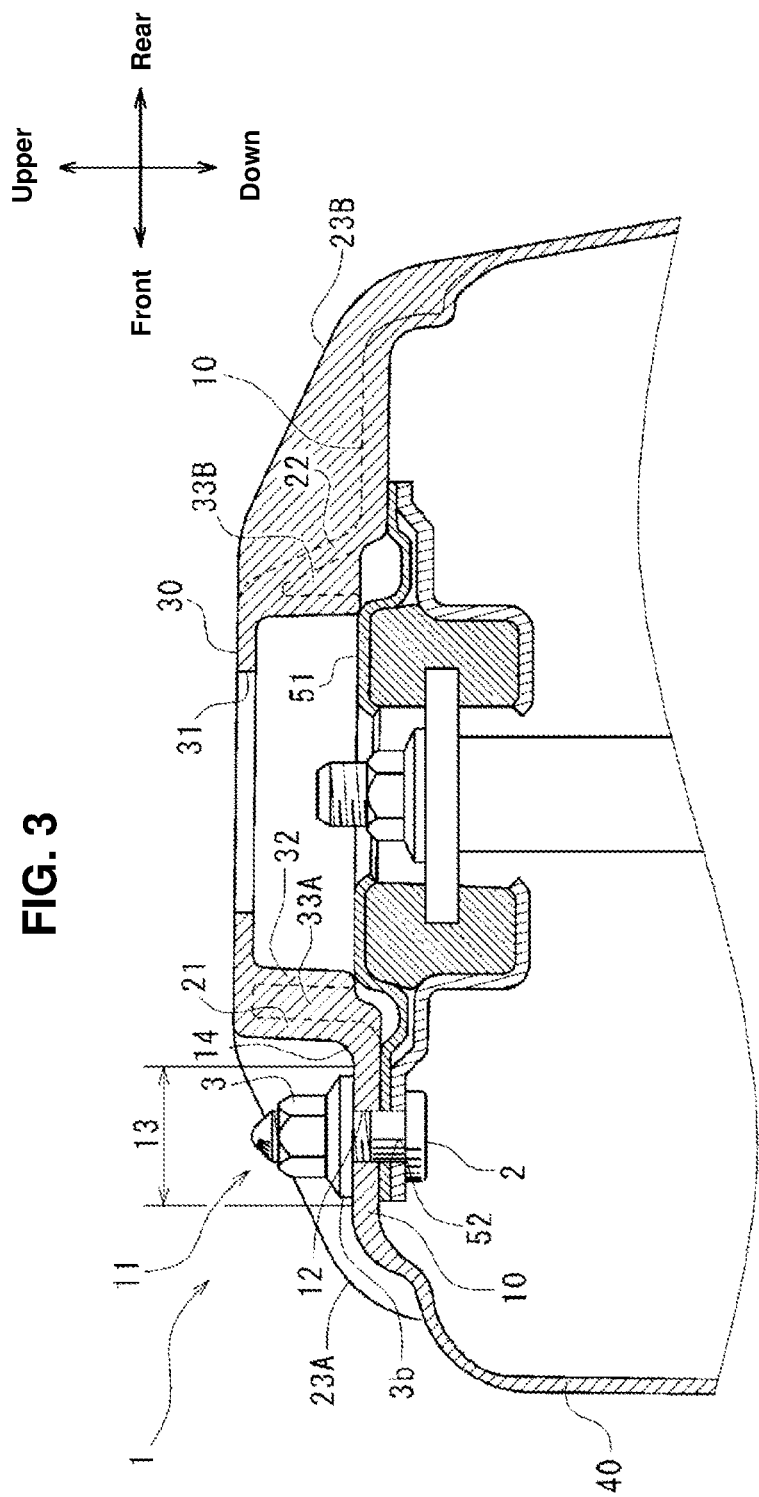
FIG. 3 is a sectional view taken along line of FIG. 2.

FIG. 3 is a sectional view taken along of FIG. 2, which shows a vertical cross section of the suspension tower portion 1 which passes through a position of the fastening portion 11. As shown in FIG. 3, at the fastening portion 11 are provided a tower-portion attachment hole 12 which vertically penetrates the fastening face portion 10 and a flat-face-shaped fastening seat face portion 13 which is positioned around the tower-portion attachment hole 12. Further, the suspension 50 has a suspension attachment hole 52 which is located at a position corresponding to the tower-portion attachment hole 12 at its upper-side attached portion 51.

The suspension 50 is fixedly fastened to a lower face of the fastening face portion 10 in such a manner that three fastening bolts 2 are inserted into the attachment holes 52, 12 from below and the fastening nuts 3 are fastened onto the fastening seat face portions 13.

Herein, the fastening seat face portion 13 is configured in a flat-face shape having a specified size such that it roughly matches the fastening seat portion 3b of the fastening nut 3 fastened to the fastening portion 11 or the fastening nut 3 is capable of being placed onto it. Further, the arc-shaped wall portion 21 is configured to rise from the fastening seat face portion 13 via a R portion 14, and to be spaced apart from the fastening seat portion 3b of the fastening nut 3, having the roughly constant distance therebetween, as described above. Accordingly, the distance between the peripheral portion of the fastening seat portion 3b of the fastening nut 3 and the R portion 14 or the arc-shaped wall portion 21 is configured to be roughly constant in the circumferential direction.

The top face portion 30 includes an opening portion 31 which vertically penetrates its central portion and a ring-shaped opening-portion rib 32 which extends downward from the top face portion 30 around the opening portion 31. Referring to FIG. 2 as well, plural inner-peripheral-side ribs 33 which extend downward from a lower face of the top face portion 30 are provided on an inner-peripheral side of the vertical wall portion 20. The inner-peripheral-side ribs 33 are provided to extend radially from the opening-portion rib 32 so as to connect the opening-portion rib 32 and the vertical wall portion 20.

The inner-peripheral-side ribs 33 are positioned above the suspension 50 fixedly fastened to the fastening face portion 10 and located at a specified level so as to contact the suspension 50 substantially or not to interfere with the suspension 50. Further, the inner-peripheral-side ribs 33 comprise each a first inner-peripheral-side rib 33A which connects the opening-portion rib 32 and the arc-shaped wall portion 21 and a second inner-peripheral-side rib 33B which connects the opening-portion rib 32 and the connecting wall portions 22.

Specifically, the first inner-peripheral-side rib 33A is configured to connect the opening-portion rib 32 and the arc-shaped wall portion 21 with substantially the shortest distance, and a roughly middle portion 21a, in an extension direction, of an arc-shaped portion of the arc-shaped wall portion 21 is connected to the opening-portion rib 32 via this first inner-peripheral-side rib 33A.

Likewise, the second inner-peripheral-side rib 33B is configured to connect the opening-portion rib 32 and the connecting wall portion 22 with substantially the shortest distance, and a roughly middle portion 22a, in a longitudinal direction, of the connecting wall portion 22 is connected to the opening-portion rib 32 via this second inner-peripheral-side rib 33B.

As shown in FIGS. 1 and 2, plural outer-peripheral-side ribs 23 are provided at the upper face of the fastening face portion 10 on an outer-peripheral side of the vertical wall portion 20. The outer-peripheral-side ribs 23 each extends radially toward the outer-peripheral wall portion 40.

The outer-peripheral-side rib 23 is configured to have a specified height which is equal to or lower than that of the top face portion 30, and its height decreases gradually toward the outer-peripheral wall portion 40. Further, the outer-peripheral-side ribs 23 comprise six first outer-peripheral-side ribs 23A which extend radially from both end portions, in the arc direction, of the arc-shaped wall portion 21 toward the outer-peripheral wall portion 40 and three second outer-peripheral-side ribs 23B which extend radially from the connecting wall portions 22 toward the outer-peripheral wall portion 40.

Herein, the second outer-peripheral-side rib 23B is configured to extend from the roughly middle portion 22a, in the longitudinal direction, of the connecting wall portion 22, that is—to extend continuously to the second inner-peripheral-side rib 33B via the connecting wall portion 22. In other words, the second inner-peripheral-side rib 33B and the second outer-peripheral-side rib 23B are configured to extend radially and continuously from the top face portion 30 via the vertical wall portion 20 over the fastening face portion 10.

The connecting wall portion 22 and a pair of the first inner-peripheral-side ribs 33A, 33B which are positioned on the both sides of the connecting wall portion 22 are arranged at positions which correspond to three sides of a triangle, respectively, in the plan view.

Next, performance/effects of the suspension tower portion structure according to the present embodiment will be described.

In the above-described embodiment, the fastening seat face portion 13 of the fastening portion 11 of the present embodiment is configured in the shape having the minimum size such that it roughly matches the fastening seat portion 3b of the fastening nut 3 or the fastening nut 3 is capable of being placed onto it. That is, since a non-fastening portion (a flat face portion) of the fastening seat face portion 13 which is not fastened by the fastening nut 3 is small, a decrease of the face rigidity of the fastening seat face portion 13 which is caused by the non-fastening portion is suppressed.

Further, the arc-shaped wall portion 21 is provided to rise from the fastening seat face portion 13 via the R portion 14, and extend along the fastening seat portion 3b of the fastening nut 3 fastened onto the fastening portion 11, having the constant distance between them in the plan view. That is, the rigidity of the fastening portion 11 is improved so as to be substantially uniform on the side of the central-axis line of the suspension 50 by the arc-shaped wall portion 21.

Herein, while a stress which is generated on the side of the central-axis line of the suspension 50 at the fastening portion 11 by the load inputted in the vertical direction from the suspension 50 is relatively great, the rigidity of the fastening portion 11 is improved so as to be substantially uniform on the side of the central-axis line of the suspension 50 as described above. Accordingly, the stress generated at the fastening portion 11 is made substantially constant at the peripheral portion of the fastening seat portion 3b of the fastening nut 3 on the side of the central-axis line of the suspension 50, so that any improper local stress concentration is prevented. Thereby, the vertical-direction rigidity of the suspension tower portion 1 can be improved effectively.

Also, since the first outer-peripheral-side rib 23A extends from the both end portions of the arc-shaped wall portion 21 to the outer-peripheral wall portion 40, the rigidity of the fastening face portion 10 is improved over a wide range from the arc-shaped wall portion 21 to the outer-peripheral wall portion 40. Thereby, the vertical-direction rigidity of the suspension tower portion 1 can be improved more effectively.

Figure 4A:
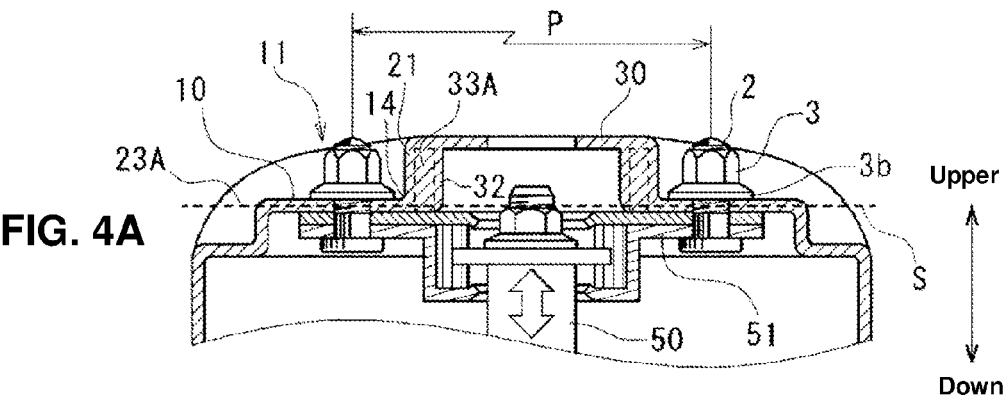
FIGS. 4A, 4B and 4C are views schematically showing deformation of the suspension tower portion structure.
Figure 4B:
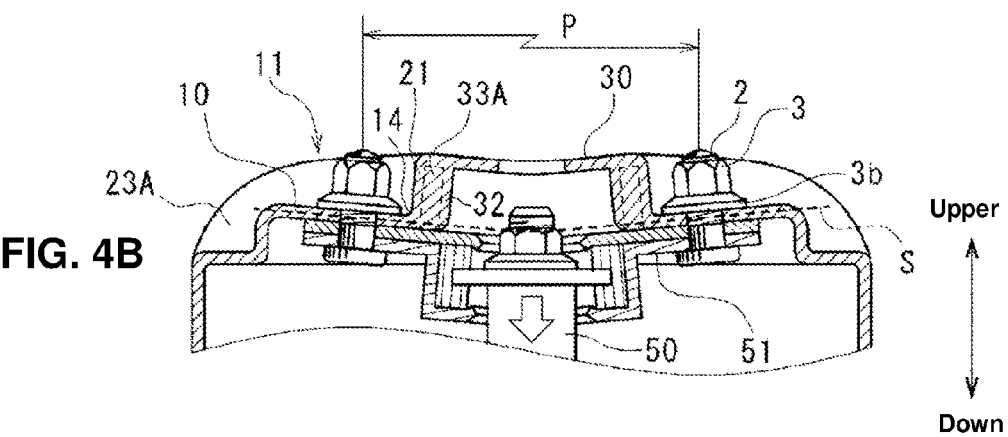
Figure 4C:
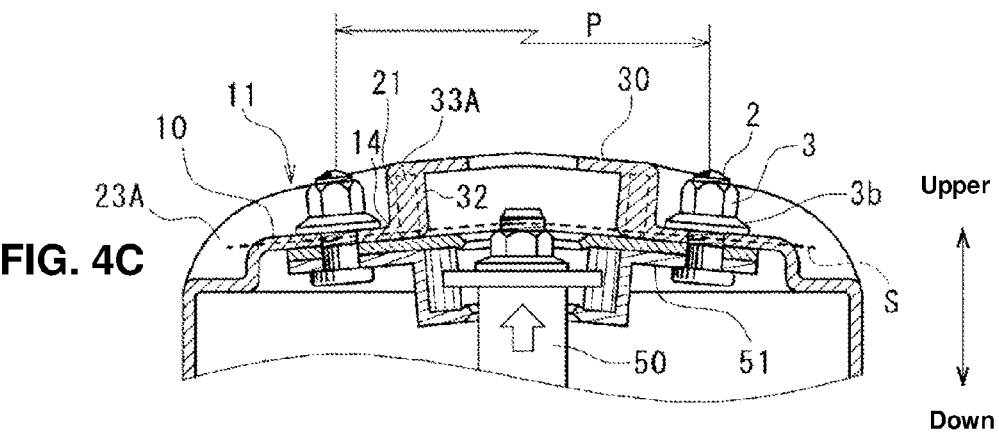

FIGS. 4A, 4B and 4C are vertical cross sections taken along line IV-IV of FIG. 2, which each passes through a position of the fastening portion 11, which schematically show deformation of the suspension tower portion 1 when a load is inputted in the vertical direction from the suspension 50. FIG. 4A shows a state before deformation, FIG. 4B shows downward deformation, and FIG. 4C shows upward deformation.

As shown in FIG. 4A, the vertical-direction load is inputted to the fastening portion 11 from the upper-side attached portion 51 through the fastening bolt 2 and the fastening nut 3. Herein, the suspension tower portion 1 is deformed vertically in a dome shape with a neutral face of a bending central face S which is positioned substantially at a middle position, in the vertical direction, of a structure body, including the upper-side attached portion 51 of the suspension 50, the fastening face portion 10, the vertical wall portion 20, and the top face portion 30.

That is, as shown in FIG. 4B, when the load is inputted downward from the suspension 50, the suspension tower portion 1 is deformed in the dome shape with the neutral face of the bending central face S in such a manner that it is curved downward. Likewise, as shown in FIG. 4C, when the load is inputted upward from the suspension 50, the suspension tower portion 1 is deformed in the dome shape with the neutral face of the bending central face S in such a manner that it is curved upward.

Herein, since the above-described embodiment is configured such that the top face portion 30 is spaced apart from the bending central face S and the inner-peripheral-side rib 33 is provided at the lower face of the top face portion 30, the secondary cross-sectional moment of the cross section, in the vertical direction, of a portion where the inner-peripheral-side rib 33 is provided, having a standard of the bending central face S, can be effectively increased, so that the vertical-direction rigidity can be improved. Consequently, since the vertical-direction rigidity of the suspension tower portion 1 is improved effectively, the vertical deformation of the suspension tower portion 1 which is caused by the vertical load inputted from the suspension 50 can be suppressed.

Moreover, since the inner-peripheral-side rib 33 is provided at the lower face of the top face portion 30, the suspension tower portion 1 is suppressed from being large sized upward.

Further, as shown in FIGS. 1 and 2, since the second outer-peripheral-side rib 23B which is continuously connected to the second inner-peripheral-side rib 33B is provided via the connecting wall portion 22, a portion having the rigidity increased by the second inner-peripheral-side rib 33B and another portion having the rigidity increased by the second outer-peripheral-side rib 23B are continuous from each other, without being separated. Thereby, a radial-shaped rib which continuously extends from the inner peripheral side to the outer-peripheral side of the connecting wall portion 22 can be formed by the second inner-peripheral-side rib 33B and the second outer-peripheral-side rib 23B, the vertical-direction rigidity of the upper portion of the suspension tower portion 1 can be improved over a wide range from the top face portion 30 to the fastening face portion 10. Thereby, the vertical rigidity of the suspension tower portion 1 can be improved more effectively.

Moreover, since the second outer-peripheral-side ribs 23B extend each to the upper portion of the outer-peripheral wall portion 40, the rigidity of the second outer-peripheral-side rib 23B can be increased by making the second outer-peripheral-side rib 23B properly long and extend to the outer-peripheral wall portion 40. Accordingly, the vertical-direction rigidity of the suspension tower portion 1 can be improved further effectively.

Also, the rigidity of the top face portion 30 can be improved by the opening-portion rib 32 and the rigidity of the top face portion 30 can be further improved by connecting the opening-portion rib 32 and the vertical wall portion 20 via the inner-peripheral-side rib 33. Accordingly, the vertical-direction rigidity of the suspension tower portion 1 can be improved further effectively.

Further, since the respective fastening portions 11 are straightly connected to each other by the connecting wall portions 22 via the arc-shaped wall portions 21 positioned around the fastening portions 11 in the above-described embodiment, scaling of the forming pitch P between the respective fastening portions 11 can be suppressed. For example, when the vertical load is inputted from the suspension 50, the scaling of the forming pitch P between the respective fastening portions 11 which is caused by the dome-shaped deformation of the fastening face portion 10 can be suppressed. And, the dome-shaped deformation of the fastening face portion 10 is suppressed by suppressing the scaling between the fastening portions 11. Thereby, the vertical rigidity of the suspension tower portion 1 can be improved effectively.

Moreover, since the connecting wall portions 22 are located at the positions which correspond to the sides of the triangle in the plan view, the rigidity of the connecting wall portions 22 can be effectively improved by the effect of a truss structure and the scaling of the forming pitch P between the respective fastening portions 11 can be suppressed. Thereby the vertical rigidity of the suspension tower portion 1 can be improved further effectively.

Further, since the connecting wall portions 22 and the first inner-peripheral-side ribs 33A, 33A which are positioned on the both sides are located at the positions corresponding to the sides of the triangular in the plan view, the rigidity of the connecting wall portions 22 and the first inner-peripheral-side ribs 33A can be improved more. Thereby, the scaling of the forming pitch P between the respective fastening portions 11 can be effectively suppressed more. Thereby the vertical rigidity of the suspension tower portion 1 can be improved more effectively.

Figure 5:
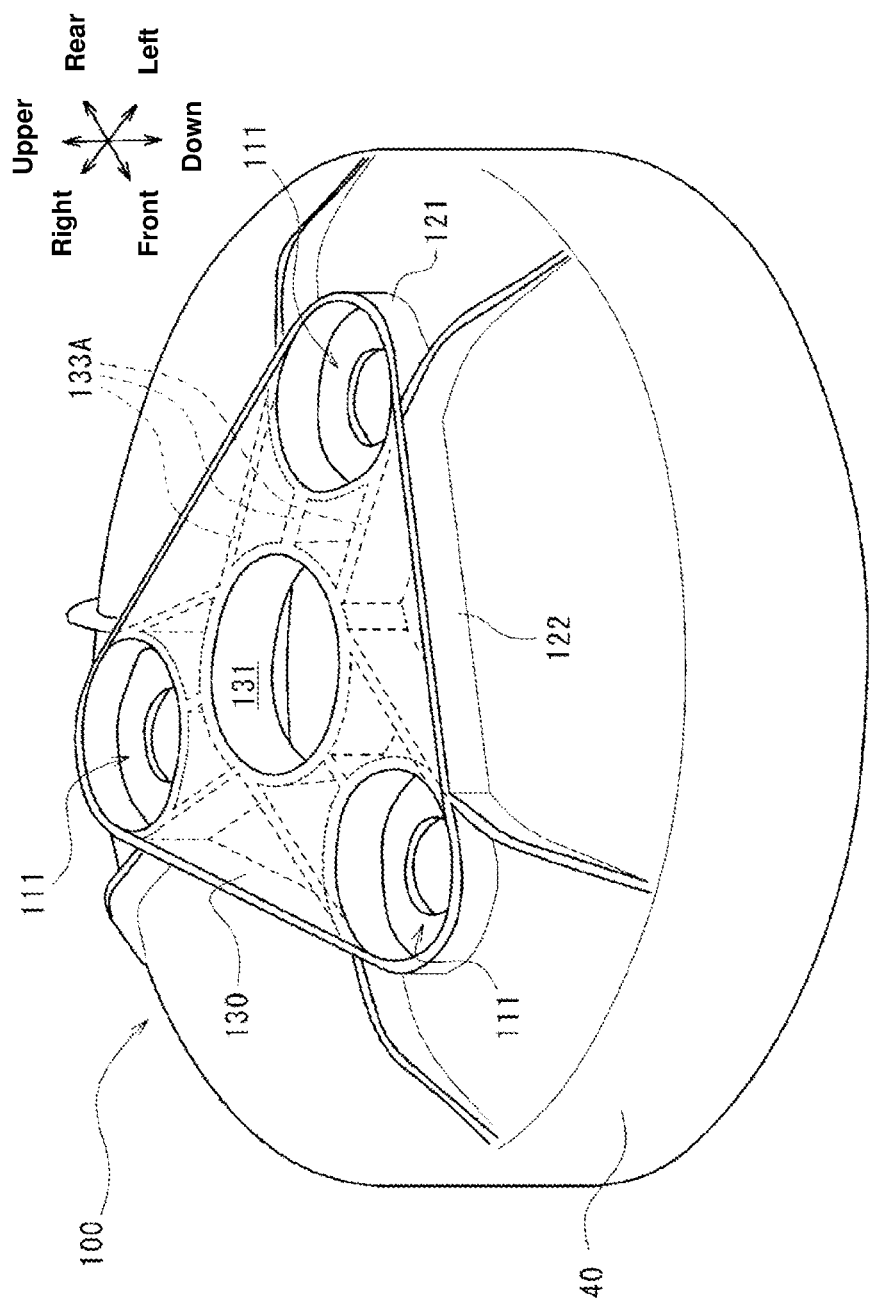
FIG. 5 is a perspective view showing a suspension tower portion structure according to a modification.

Herein, the above-described embodiment is configured such that the arc-shaped wall portion 21 is formed on the inner-peripheral side only, not formed on the side of the outer-peripheral wall portion 40, in order to prevent the water from staying. However, in a case in which another countermeasure against the water staying, such as a cover, or there is no problem with the water staying at the fastening portion 11, a cylindrical wall portion 121 which surrounds an entire periphery of a fastening portion 111 may be provided like a suspension tower portion 100 according to a modification shown in FIG. 5. In this case, a connecting wall portion 122 may be formed straightly so that the connecting wall portion 122 tangentially connects to an edge portion of the cylindrical wall portion 121 on the side of an outer-peripheral wall portion 140.

Further, plural first inner-peripheral-side ribs 133A (three, for example) which each connect the opening-portion rib 131 and the cylindrical wall portion 121 may be provided. Thereby, the connection rigidity of the cylindrical wall portion 121, the top face portion 130, and the first inner-peripheral-side ribs 133A can be further improved.

Also, the suspension tower portion structure may be made by casting or forging using iron or other light metal than aluminum, instead of the aluminum die casting. Alternatively, it may be made by pressing of a steel plate or joining of plural members, such as welding. Instead, the suspension tower portion structure may be made from CFRP (carbon-fiber reinforced plastic).

Figure 6:
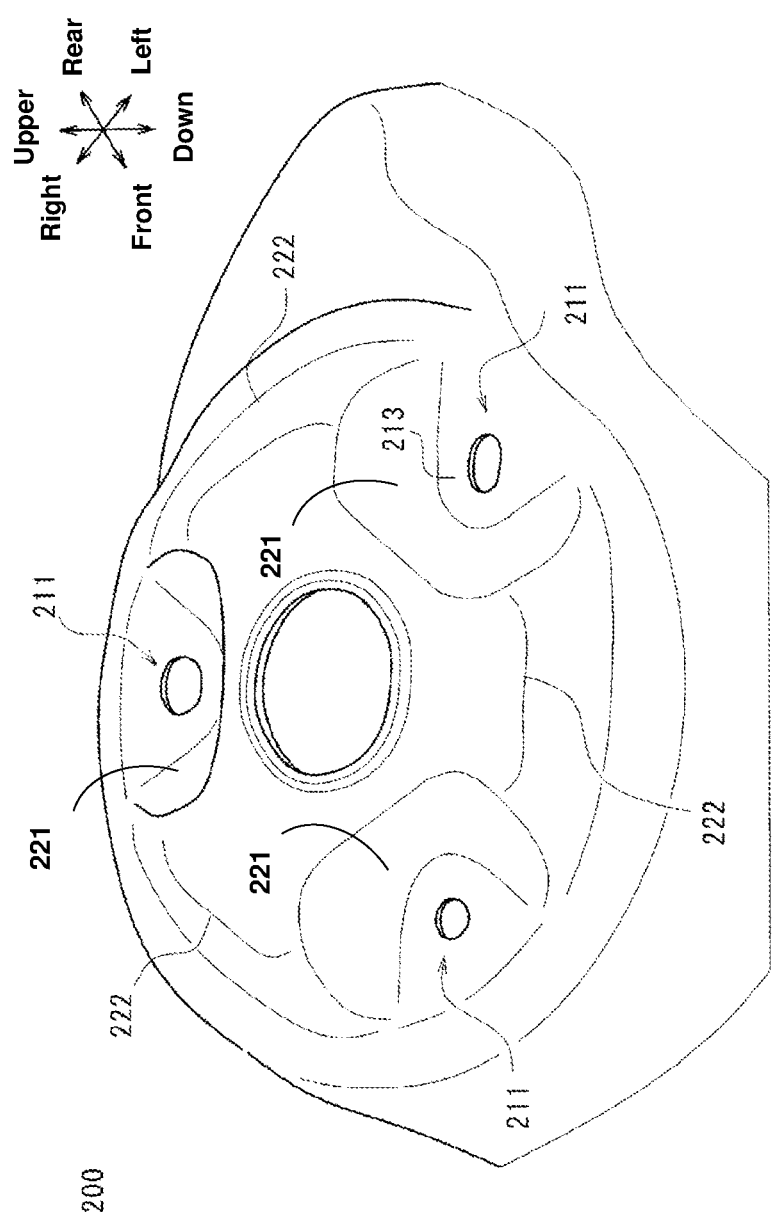
FIG. 6 is a perspective view showing a suspension tower portion structure according to another modification.

An upper portion of a suspension tower portion structure 200 according to another modification which is formed by pressing is shown in FIG. 6. As shown in FIG. 6, the suspension tower portion structure 200 is configured such that fastening-portion surrounding wall portions 221 which are provided to rise around respective fastening portions 211 are provided on the fastening face portion, fastening seat face portions 213 of the respective fastening portions 211 have each a shape positioned on the side of the central-axis line of the suspension 50, which substantially match the fastening seat portion 3b of the fastening nut 3, and a connecting ridge line 222 is formed so as to straightly connect the adjacent fastening portions 211.

Thereby, the scaling of the forming pitch P between the respective fastening portions 211 can be effectively suppressed, and also the stress generated at the peripheral portion of the fastening seat portion 3b of the fastening nut 3 can be made substantially constant on the side of the central-axis line of the suspension 50. Accordingly, the stress concentration at the fastening seat face portion 213 can be suppressed, so that the vertical rigidity of the suspension tower portion structure 200 can be effectively improved.

Further, the rib may be formed by a raw material, by joining members which has been formed separately, or by pressing. The vertical wall portion may be provided in place of the rib, and the rib may be provided in place of the vertical wall portion.

While the above-described embodiment is configured such that the fastening portions 11 are composed of three portions, two portions or four or more portions may constitute the fastening portions 11. In any case, an arc-shaped wall portion which encloses the circumference of the fastening portion 11 on the central side in an arc shape or in a cylindrical shape can be provided and also the adjacent arc-shaped wall portions (cylindrical wall portions) can be straightly connected by the connecting wall portion. Moreover, the inner-peripheral-side rib can be provided at the lower face of the top face portion which is formed by the arc-shaped wall portion (cylindrical wall portion) and the connecting wall portion at the higher level. Herein, it may be unnecessary to form an opening portion at the top face portion in a case in which the fastening portions 11 are composed of two portions.

While the above-described embodiment described the suspension tower portion structure for fixing the front suspension, the present invention is applicable to a suspension tower portion structure for fixing a rear suspension.

The present invention should not be limited to the above-described embodiments, and any other modifications or improvements may be applied within the scope of a spirit of the present invention.

What is claimed is:

1. A suspension tower portion structure of a vehicle, wherein an upper face portion of a suspension tower portion comprises a fastening face portion where plural fastening portions to which an upper end portion of a suspension is fixedly fastened are provided, plural fastening-portion surrounding wall portions which are each provided to rise around the fastening portion are provided on the fastening face portion, at least one of the fastening-portion surrounding wall portions is configured to be spaced apart from a fastening seat portion of a fastening member to be fastened to the fastening portion, having a constant distance therebetween, and the at least one of the fastening-portion surrounding wall portions is formed in an arc shape and provided on the side of a central-axis line of the suspension around the fastening portion.

2. The suspension tower portion structure of the vehicle of claim 1, wherein said fastening portions are provided at three points, three fastening-portion connecting wall portions which connect each adjacent ones of said plural fastening-portion surrounding wall portions are provided on said fastening face portion and located at positions which correspond to respective sides of a triangle in a plan view.

3. A suspension tower portion structure of a vehicle, wherein an upper face portion of a suspension tower portion comprises a fastening face portion where plural fastening portions to which an upper end portion of a suspension is fixedly fastened are provided, plural fastening-portion surrounding wall portions which are each provided to rise around the fastening portion are provided on the fastening face portion, and at least one of the fastening-portion surrounding wall portions is configured to be spaced apart from a fastening seat portion of a fastening member to be fastened to the fastening portion, having a constant distance therebetween, and wherein an outer-peripheral wall portion which extends downward from an outer edge of said fastening face portion is provided, said at least one of the fastening-portion surrounding wall portions is formed in an arc shape and provided on the side of a central-axis line of the suspension around the fastening portion, and a pair of outer-peripheral-side ribs which extend toward said outer-peripheral wall portion from both end portions, in an arc direction, of the at least one of the fastening-portion surrounding wall portions are provided on the fastening face portion.

* * * * *